April 23, 1957  A. R. STAHL  2,789,683
WORK INDEXING ARRANGEMENT
Filed Oct. 2, 1953  2 Sheets-Sheet 1
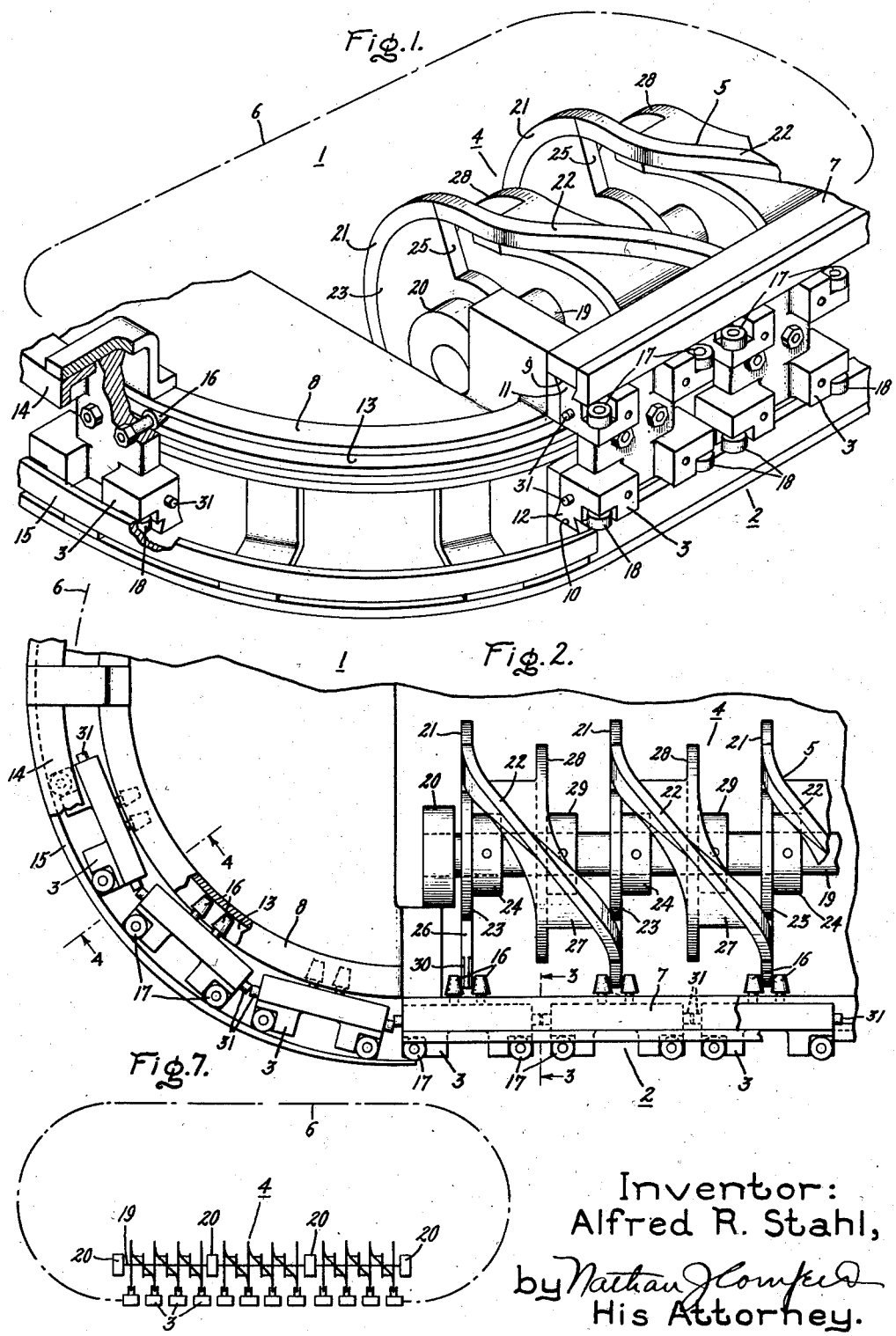
Inventor:
Alfred R. Stahl,
by Nathan J. Cornfeld
His Attorney.

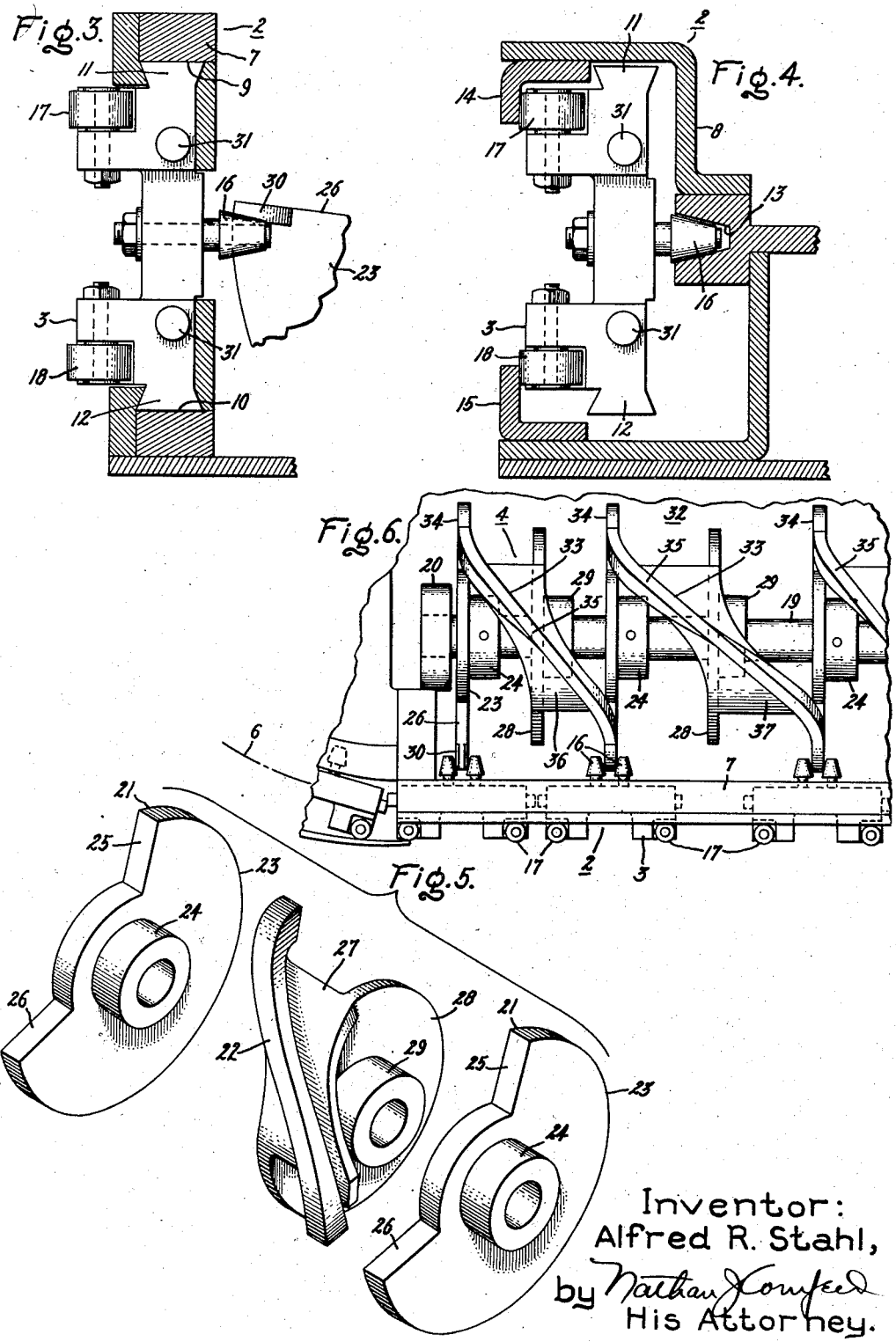

United States Patent Office 2,789,683
Patented Apr. 23, 1957

2,789,683

WORK INDEXING ARRANGEMENT

Alfred Robert Stahl, Garnet Lake, N. Y., assignor to General Electric Company, a corporation of New York Application October 2, 1953, Serial No. 383,870

8 Claims. (Cl. 198—110)

My invention relates to automatic machinery and pertains more particularly to means for indexing work holding devices at predetermined stations along a work path.

Heretofore, in automatic machinery, means including chain drives, linkages, Geneva movements, etc. have been employed for indexing work holding devices to and stationarily positioning same at predetermined work stations. All of these means have involved the use of multiple elements, and any errors in the dimensions thereof have usually resulted in additive errors, limiting the accuracy with which the work holders could be positioned. This has usually necessitated provision of additional devices in the form of locking mechanisms for insuring accurate positioning of the work holders after they had been indexed to work stations, adding to the complexity and cost of the over-all machinery.

Accordingly, a primary object of my invention is to provide a new and improved indexing arrangement.

Another object of my invention is to provide a new and improved arrangement including unitary means effective for moving work holders along a work path and for accurately holding same at predetermined work stations along the path.

Another object of my invention is to provide a new and improved arrangement including means for expeditiously advancing work holders between work stations while insuring accurate positioning thereof at such stations.

Another object of my invention is to provide a new and improved indexing arrangement including means for differentially moving work holders between work stations.

Another object of my invention is to provide a new and improved arrangement for positioning work holding devices at stations along a work path which may be made circuitous.

Still another object of my invention is to provide a new and improved arrangement for accurately positioning work holding devices at work stations along a circuitous path including means whereby the path may be changed in length simply and without adversely affecting the accuracy with which the work holding devices are positioned.

Further objects and advantages of my invention will become apparent as the following description proceeds and the features of novelty which characterize my invention will be pointed out with particularity in the claims annexed to and forming part of this specification.

In carrying out the objects of my invention I provide guide means defining a circuitous work path and including a straight portion. Movable in the guide means are work holders. Extending parallel to the straight portion of the guide means is relatively stationary rotatably mounted means including a cylindrical cam surface. The cylindrical cam surface cooperates with the work holder and is effective when the means having the cam surface formed thereon is rotated for determining movement of the work holders along the work path. The cam surface includes spiral portions for moving the holders along the path and portions extending in planes perpendicular to the axis thereof which accurately position the work holders at predetermined work stations along the path. The spiral portions of the cam surface leading to and away from the perpendicular portions may be at different oblique angles relative to the axis of the cam surface for differentially advancing the work holders. By substantially filling the guide means with work holders, the holders are positively driven by the cam surface in the straight portion of the guide means and advance the work holders in the arcuate portions of the guide means. To vary the length of the work path, the lengths of the straight portions of the guide means may be varied.

For a better understanding of my invention, reference may be had to the accompanying drawing in which:

Fig. 1 is a fragmentary perspective view of a preferred embodiment of my invention;

Fig. 2 is a fragmentary plan view of the preferred embodiment;

Fig. 3 is an enlarged sectional view taken along the line 3—3 in Fig. 2;

Fig. 4 is an enlarged sectional view taken along the line 4—4 in Fig. 2;

Fig. 5 is an enlarged exploded perspective view illustrating the elements I employ for forming the cylindrical cam surface;

Fig. 6 is a fragmentary plan view of a modified form of my invention; and

Fig. 7 is a schematic showing how the work path may be varied in length.

Referring to the drawing, I have shown in Figs. 1 and 2 a preferred embodiment of my invention generally designated 1 and comprising guide means 2 defining a work path, members or work holders 3 adapted for moving in the guide means and relatively stationary rotatably mounted means 4 including a cylindrical cam surface 5 adapted to determine the movement thereof along the work path when the means 4 is rotated for cooperating with the work holders.

The guide means 2 is not fully shown, but as indicated by the dot and dash line 6 defines a circuitous work path. The guide means includes a straight portion 7 and an arcuate portion 8. As best seen in Figs. 1 and 3, the straight portion 7 of the guide means is constructed to include a longitudinally-extending upper dovetail groove 9 and a similar opposite lower dovetail groove 10.

The grooves 9 and 10 are adapted for loosely receiving elongated upper and lower dovetails 11 and 12, respectively, formed on the upper and lower sides of the work holders 3. By this arrangement the work holders 3 are arranged to be slidingly movable in the straight portion 7 of the guide means 2.

The arcuate portion 8 of the guide means 2, as best seen in Figs. 1, 2 and 4, is constructed to include a horizontal, inwardly opening, substantially U-shaped groove 13, a pendent upper guide rail 14 and an upright lower guide rail 15. Suitably carried on the inner side of each of the holders 3 and adapted for revolving about horizontal axes is a spaced apart pair of horizontally aligned, inwardly projecting and tapered rollers or laterally projecting means 16. The rollers 16 serve both as anti-friction support means for riding in the U-shaped groove 13 for assisting in supporting the holders during travel thereof in the arcuate portion of the guide means and as anti-friction members for cooperating with the work holder positioning cam to be described in detail hereinafter. Also provided for assisting in the support of the work holders are upper and lower spaced apart pairs of rollers or anti-friction means 17 and 18, respectively, arranged for revolving about vertical axes. The upper rollers 17 are adapted for engaging and rolling on the inner surface of the above-mentioned pendent guide rail 14 while the lower rollers 18 are adapted for engaging and rolling on the inner surface of the above-mentioned upright guide rail 15.

In the arrangement described to this point, the work holders 3 are adapted for guided movement along the work path 6. The guide means shown and described teaches how the guide means can be circuitous and therefore how the work path can be made endless. That is, in my structure, the work holders can be successively moved past several work stations about the work path, such as loading stations, operating stations and unloading stations and returned to the loading stations.

As stated above, the means including the cylindrical cam surface 5 is adapted for cooperating with the work holders 3 to determine the movement thereof along the work path 6. In the preferred embodiment of my invention, and as best seen in Figs. 1, 2 and 5, this means comprises a cam shaft 19 suitably journaled at its ends in the machine, one end journal being shown at 20, and adapted for being driven by any suitable drive means (not shown) in a clockwise direction in Fig. 1. The cam shaft 19 is so journaled that the axis thereof extends parallel to the straight portion 7 of the guide means 2. The cylindrical cam surface 5 on the cam shaft 19 comprises portions extending at different angles relative to the axis of the cam shaft which is also the axis of the cam surface.

In the form of my invention shown in Figs. 1, 2 and 5 the cam surface 5 comprises a plurality of equally spaced apart straight portions 21 extending in planes perpendicular to the axis of the shaft and predeterminedly positioned along the work path 6 and portions 22 connecting or extending between the straight portions 21 at oblique angles relative to the axis of the shaft. The portions 22 shall hereinafter be referred to as the axial cross-over portions. In forming the cam surface having these characteristics I prefer using for the straight portions 21 mutilated wheels or circular cam sectors 23 including hubs 24 whereby the sectors are adapted for being secured on the cam shaft 19. The cam sectors 23 further include radial edges which are referred to as the leading and trailing edges 25 and 26, respectively, in view of the clockwise rotation of the sectors in Fig. 1.

The obliquely extending or spiral cross-over portions 22 of the cylindrical cam surface 5 extend between the leading and trailing edges of adjacent cam sectors. I prefer to form these spiral cross-overs independently as members 27 which I suitably fasten to the shaft 19 so as to connect the leading and trailing edges of adjacent cam sectors 23 for providing a continuous cylindrical cam surface. The cross-over members 27 I secure as by welding to the peripheries of discs 28 formed to include hubs 29 whereby the discs are adapted for being secured to the shaft 19.

The cam surfaces 21 and 22 formed by the sectors 23 and the cross-over members 27, respectively, cooperate to form the continuous cylindrical cam surface which is adapted for riding between the spaced apart pairs of tapered rollers 16, thereby to cooperate with the holders 3 for determining movement thereof in the guide means 2 and along the work path indicated by 6. It will be seen that in the arrangement just described rotation of the means 4 including the cam shaft 19 and the cam surface 5 will effect movement of the work holders 3 along the work path when the cross-over portions 22 are disposed between and engaging the pairs of rollers 16 on the work holders. Thereafter continuous rotation of the cam surface causes the work holders to be moved to work positions or stations at which the straight portions 21 of the cam surface are disposed between and engage the pairs of rollers 16. In these work stations the holders are caused to dwell or be positioned by the straight portions 21, the duration of the stay of work holders in the work stations being dependent upon the length of the straight portions and the speed of rotation of the cam shaft.

It will be seen that in my arrangement the cam surface 5 is effective both for moving the work holders 3 between work stations and for positioning them at the work stations. Further, accurate positioning and holding of the work holders at the work stations are afforded by the straight portions 21 and these portions of the cam surface are the only portions which need be accurately machined. The cross-over portions 22, since they serve only to move the holders between stations, need not be as accurately formed as the straight portions.

As each of the holders is disengaged by the last straight portion 21 of the cam surface before the arcuate portion of the guide means 2, the tapered rollers are aligned with the U-shaped groove 13 in the arcuate portion 8 of the guide means and the upper and lower rollers 17 and 18 are aligned for engagement with the inner surface of the pendant and upright rails 14 and 15, respectively, on the arcuate portion of the guide means. Subsequent movement of the succeeding holder, as effected by the last cross-over portion 22, causes the succeeding holder to engage the one before it and advance it along the arcuate portion of the guide means, this action being facilitated by a taper 30 formed on the end of the trailing edge 26 of the last sector 23. Thus the rollers 16 are moved into the groove 13 and the rollers 17 and 18 are moved into engagement with the rails 14 and 15, respectively, whereby the holder is supported for movement along the work path in the arcuate portion of the guide means. As seen in Figs. 1 through 4, each of the work holders is provided with a spaced apart pair of vertically aligned lugs 31. The lugs 31 on the rear end of each holder are adapted for being engaged by the lugs on the forward end of the succeeding holder and thereby are effective for facilitating movement of the holders along the work path and insuring saisfactory spacing between holders.

It will be seen that by making the guide means circuitous and by filling it with work holders, a substantially continuous or endless train of work holders can be provided which can be driven and indexed satisfactorily by one or more of the cam surfaces cooperating with the cam holders at one or more straight portions of the guide means.

The second form of my invention generally designated 32 and shown in Fig. 6 is identical to the above-described first form in that it provides guide means 2, a plurality of moveable members or work holders 3, each including a pair of spaced apart rollers 16 and relatively stationary, rotatably mounted means 4 including a suitably journaled cam shaft 19. This form differs, however, in that the shaft 19 carries a cylindrical cam surface 33 comprising a plurality of differentially spaced apart predeterminedly positioned, straight portions 34 extending in planes perpendicular to the axis of the shaft, and spiral portions 35 which connect the straight portions and which extend at different oblique angles relative to the axis of the shaft. In this form of my invention cam surface 33 will ride between the pairs of rollers 16 and the work holders 3 will be thereby indexed to predetermined work stations along the work path 6 corresponding to the straight portions 34 of the cam surface. Additionally, in this form the difference in spacing between the portions 34, and therefore the angles at which the portions 35 extend between the portions 34, causes the work holders to move at different speeds from one work station to another. In the present form of my invention, as in the first described form, the straight cam portions 34 are provided by using mutilated wheels or circular cam sectors 23 formed to include hubs 24 for securing the sectors on the cam shaft 19. Also, the cross-over or spiral portions 35 connecting the straight portions are formed independently as members 36 and 37 and welded to the peripheries of discs 28 having hubs 29, adapting them for being secured to the shaft between adjacent sectors 23 so as to connect the leading and trailing edges thereof and to provide a continuous cylindrical cam surface.

It will be seen that while I have shown in both embodiments of my invention single cylindrical cam surfaces for actuating and indexing the work holders of a train of work holders adapted for guided movement about a circuitous work path, a plurality of such cylindrical cam surfaces can be employed in the manner shown in Fig. 7. That is, if it should be desired that the work path 6 be lengthened, the straight portions of the guide means and the cam shaft 19 can be lengthened and additional cylindrical cam surfaces 4 can be provided on the shaft for cooperating with the work holders 3. In such an arrangement, the cam shaft is journaled at points 20 intermediate adjacent cam surfaces 4 and each work holder is moved between cam surfaces by being pushed by the successive holder. When the path is lengthened in the just described manner addition of work holders to the train thereof will be required.

It is to be understood that while I have shown and described my invention as including a cam surface in thread form for cooperating with the pairs of rollers 16 on the work holders 3 for moving same along the work path 6, the cam surface can be alternatively formed as a groove in a shaft or drum for receiving single rollers carried on the work holders and cooperating therewith to move the holders.

It is to be understood further that while I have shown the portions 21 and 34 of the cam surfaces 5 and 33, respectively, as being straight or in planes perpendicular to the axis thereof for locking the work holders in predetermined fixed work stations they can be slightly spiraled for moving the work holders at a predetermined slow speed past the work stations after they have been quickly indexed to such stations by the cross-over or spiral portions of the cams.

While I have shown and described specific embodiments of my invention, I do not desire my invention to be limited to the particular forms shown and described and I intend by the appended claims to cover all modifications within the spirit and scope of my invention.

What I claim as new and desire to secure by Letters Patent of the United States is:

1. In a work positioning machine, a moveable work holder including laterally projecting means, and relatively stationary, rotatably mounted means including a cylindrical cam surface cooperating with said projecting means, said cam surface and said projecting means cooperating in a straddling manner for effecting positive movement of said holder along a work path parallel to the axis of said cam surface, means holding said projecting means in engagement with said cam surface, said cam surface including a plurality of spaced, predeterminedly positioned portions extending in planes perpendicular to said axis for positioning said work holder at predetermined work stations along said path, and portions extending between said perpendicular portions at oblique angles relative to said axis for moving said work holder to and from said work stations.

2. In a work positioning machine, a moveable work holder including laterally projecting means, and relatively stationary, rotatably mounted means including a cylindrical cam surface cooperating with said projecting means, said cam surface and said projecting means cooperating in a straddling manner for effecting positive movement of said holder along a work path parallel to the axis of said cam surface, means holding said projecting means in engagement with said cam surface, said cam surface including a plurality of spaced, predeterminedly positioned portions extending in planes perpendicular to said axis for positioning said work holder at predetermined work stations along said path, and portions extending between said perpendicular portions at different oblique angles relative to said axis for moving said work holder between said work stations at different speeds.

3. In a work positioning machine, guide means defining a work path, a plurality of work holders moveable in said guide means for movement along said work path, anti-friction support means carried by said work holders and cooperating with said guide means to facilitate movement of said work holders therein, and relatively stationary, rotatably mounted means including a cylindrical cam surface engaging said support means on said work holders, the axis of said cam surface extending parallel to at least a portion of said guide means, said cam surface being effective when rotated for determining movement of said holders along said path, said cam surface including a plurality of portions extending at oblique angles relative to said axis for positively driving said work holders into a plurality of predeterminedly positioned work stations along said path, said cam surface further including a plurality of portions connecting said oblique portions and extending in planes perpendicular to said axis of said cam surface, said perpendicular portions being accurately formed in comparison with said oblique portions and each being effective for accurately positioning said work holders at one of said predetermined work stations along said path.

4. In a work positioning machine, guide means defining a work path, said guide means including a straight portion and an arcuate portion, a plurality of work holders moveable in said guide means along said work path, anti-friction support means carried by said work holders and cooperating with said guide means to facilitate movement of said work holders therein, and relatively stationary, rotatably mounted means including a cylindrical cam surface, the axis of said cam surface extending parallel to said straight portion of said guide means, said cam surface, engaging said support means on said work holders and being effective when rotated for determining movement of said holders along said path, said cam surface including spaced portions extending at oblique angles relative to said axis for positively driving some of said work holders along said path whereby others of said work holders are also advanced along said path, said cam surface further including a plurality of predeterminedly positioned portions extending in planes perpendicular to said axis of said cam surface between said oblique portions and each being effective for positioning said work holders at predetermined stations along said path.

5. In a work positioning machine, circuitous guide means defining an endless work path, a plurality of workholders substantially filling said guide means and being moveable therein for movement along said path, said guide means including a straight portion, said work holders carrying rollers projecting from said guide means when said holders are at said straight portion of said guide means, and a relatively stationary, rotatably mounted means including a cylindrical cam surface, the axis of said cam surface extending parallel to said straight portion of said guide means whereby said cam surface engages said rollers at said straight portion, said cam surface being effective when rotated for determining movement of said holders about said path, said cam surface including a plurality of spaced, predeterminedly positioned portions extending in planes perpendicular to said axis for positioning said work holders at predetermined work stations along said path, and portions extending between said perpendicular portions at oblique angles relative to said axis for moving said work holders to and from said work stations.

6. In a work positioning machine, circuitous guide means defining an endless work path, a plurality of work holders substantially filling said guide means and being moveable therein for movement about said work path, said guide means including a straight portion, said work holders carrying rollers projecting from said guide means when said holders are at said straight portion of said guide means, and relatively stationary, rotatably mounted means including a cylindrical cam surface, the axis of said cam surface extending parallel to said straight portion of said guide means whereby said cam surface engages said rollers at said straight portion, said cam surface being effective when rotated for determining movement of said holders about said path, said cam surface including a plurality of spaced, predeterminedly positioned portions extending in planes perpendicular to said axis for positioning said work holders at predetermined work stations along said path, and portions extending between said perpendicular portions at different oblique angles relative to said axis for moving said work holders between said work stations at different speeds.

7. In a machine for accurately positioning a work piece successively at a plurality of work stations, a moveable holder for said work piece, said holder carrying a plurality of spaced rollers, a rotating shaft, a plurality of spaced helical cam members carried by said shaft, said helical cam members being adapted for riding between said rollers to advance said holder successively into a plurality of predeterminedly positioned work stations, and a plurality of separately formed cam sectors carried by said shaft and extending in planes perpendicular thereto, said sectors connecting said helical members and each being adapted for riding between said rollers to position said holder at one of said stations, the engaging surfaces of said rollers and said cam sectors being formed to provide accurate positioning of said holder and work piece held thereby at said work stations.

8. In a machine for accurately positioning a plurality of work pieces successively at a plurality of work stations, a circuitous guide means defining an endless work path, a plurality of holders for said work pieces substantially filling said guide means and moveable therein for movement about said work path, each of said holders carrying a pair of spaced rollers, a rotating shaft, a plurality of spaced helical cam members carried by said shaft, said helical cam members each being adapted for riding between said rollers to advance said holders successively into a plurality of predeterminedly positioned work stations, and a plurality of spaced separately formed cam sectors carried by said shaft and extending in planes perpendicular thereto, said cam sectors connecting said helical members and each being adapted for riding between said rollers to position said holders successively at one of said work stations, the engaging surfaces of said rollers and said cam sectors being formed to provide accurate positioning of said holders and work pieces held thereby at said work stations.

References Cited in the file of this patent
UNITED STATES PATENTS

| | | |
|---|---|---|
| 761,610 | Riblet | May 31, 1904 |
| 1,511,011 | Adkins et al. | Oct. 7, 1924 |
| 1,632,569 | Taylor | June 14, 1927 |
| 1,984,659 | Simmons et al. | Dec. 18, 1934 |
| 2,259,748 | Hullhorst | Oct. 21, 1941 |
| 2,264,549 | Pecker | Dec. 2, 1941 |
| 2,546,314 | Merwin et al. | Mar. 27, 1951 |